United States Patent

Lund

[19]

[11] Patent Number: 6,104,789
[45] Date of Patent: Aug. 15, 2000

[54] METHOD AND SYSTEM FOR TRANSMITTING TEXT MESSAGES FROM A CALLER TO A SUBSCRIBER AT AN UNKNOWN ADDRESS

[75] Inventor: Arnold M. Lund, Louisville, Colo.

[73] Assignees: U S West, Inc., Denver; MediaOne Group, Inc., Englewood, both of Colo.

[21] Appl. No.: 08/998,795

[22] Filed: Dec. 29, 1997

[51] Int. Cl.$^7$ .................................................. H04M 11/00
[52] U.S. Cl. ................................... 379/93.23; 379/93.24; 379/93.26
[58] Field of Search ............................. 379/93.23, 93.18, 379/93.27, 93.24, 219, 220, 222, 223, 88.13, 88.14, 93.26, 100.08, 100.13

[56] References Cited

U.S. PATENT DOCUMENTS

| | | | |
|---|---|---|---|
| 5,031,206 | 7/1991 | Riskin | 379/93.27 |
| 5,530,740 | 6/1996 | Irribarren et al. | 379/93.24 |
| 5,742,769 | 4/1998 | Lee et al. | 707/100 |
| 5,852,657 | 12/1998 | Malik et al. | 379/93.23 |
| 5,870,454 | 2/1999 | Dahlen | 379/88.13 |
| 5,987,508 | 11/1999 | Agraharam et al. | . |
| 6,014,711 | 1/2000 | Brown | 379/93.23 |

*Primary Examiner*—Stella Woo
*Attorney, Agent, or Firm*—Brooks & Kushman P.C.

[57] ABSTRACT

A method and system for transmitting a text message from a caller to a subscriber at an unknown address based on a known address or number associated with the subscriber includes a server application having a database. The database contains addresses and phone numbers associated with the subscriber. The caller transmits a first signal to obtain access to the database, and then transmits a second signal representative of one of the known address and number upon accessing the database. The caller then receives either a text-based address or number, or both, associated with the subscriber in response to the second signal. A text-based address or number is an address or phone number capable of receiving text messages, such as an e-mail address or fax number. The caller then transmits a text message to one of the text-based address and number for receipt by the subscriber.

17 Claims, 3 Drawing Sheets

METHOD AND SYSTEM FOR TRANSMITTING TEXT MESSAGES FROM A CALLER TO A SUBSCRIBER AT AN UNKNOWN ADDRESS

TECHNICAL FIELD

This invention relates to methods and systems for transmitting text messages from a caller to a subscriber at an unknown address based on a known address or number associated with the subscriber.

BACKGROUND ART

There are several ways one person can reach another person, such as, for example, fax machines, cellular telephones, pagers, electronic mail, and voice mail. Although an individual's telephone number may be found utilizing directory assistance or a telephone directory, there is no convenient way to find the other numbers or addresses for many of these new forms of communication.

It has recently become possible to retrieve names and physical addresses of individuals based on the telephone number associated with the individual. This is commonly referred to as Reverse Directory Assistance (or, Reverse DA) and is implemented in existing switch-based telecommunications systems. However, it is desirable to retrieve the other addresses associated with the individual based on the individual's known telephone number.

DISCLOSURE OF THE INVENTION

It is a general object of the present invention to provide a method and system for retrieving unknown addresses and phone numbers based on known addresses or phone numbers.

It is another object of the present invention to transmit text messages to a subscriber upon retrieving the unknown addresses or phone numbers.

Still further, it is another object of the present invention to automatically retrieve graphical pages associated with the subscriber upon retrieving the unknown addresses or phone numbers.

In carrying out the above objects and other objects, features, and advantages of the present invention, a method is provided for transmitting a text message from a caller to a subscriber at an unknown address based on a known address or number associated with the subscriber. The method includes the steps of transmitting a first signal to obtain access to a database and transmitting a second signal representative of one of the known address and number upon accessing the database. The method also includes the step of receiving one of a text-based address and number associated with the subscriber in response to the second signal wherein the text-based address and number are capable of receiving text messages. Finally, the method includes the step of transmitting a text message for receipt by the subscriber upon receiving one of the text-based address and number.

In further carrying out the above object and other objects, features, and advantages of the present invention, a system is also provided for carrying out the steps of the above described method. The system includes a server application having a database containing addresses and phone numbers associated with the subscriber. The system also includes an input device for transmitting a first signal to obtain access to the database and transmitting a second signal representative of one of the known address and number upon accessing the database. Still further, the system includes means for receiving one of a text-based address and number associated with the subscriber in response to the second signal, the text-based address and number capable of receiving text messages. The input device is further provided for transmitting a text message for receipt by the subscriber upon receiving one of the text-based address and number.

The above objects and other objects, features and advantages of the present invention are readily apparent from the following detailed description of the best mode for carrying out the invention when taken in connection with the accompanying drawings.

BEST MODES FOR CARRYING OUT THE INVENTION

Figure 1:
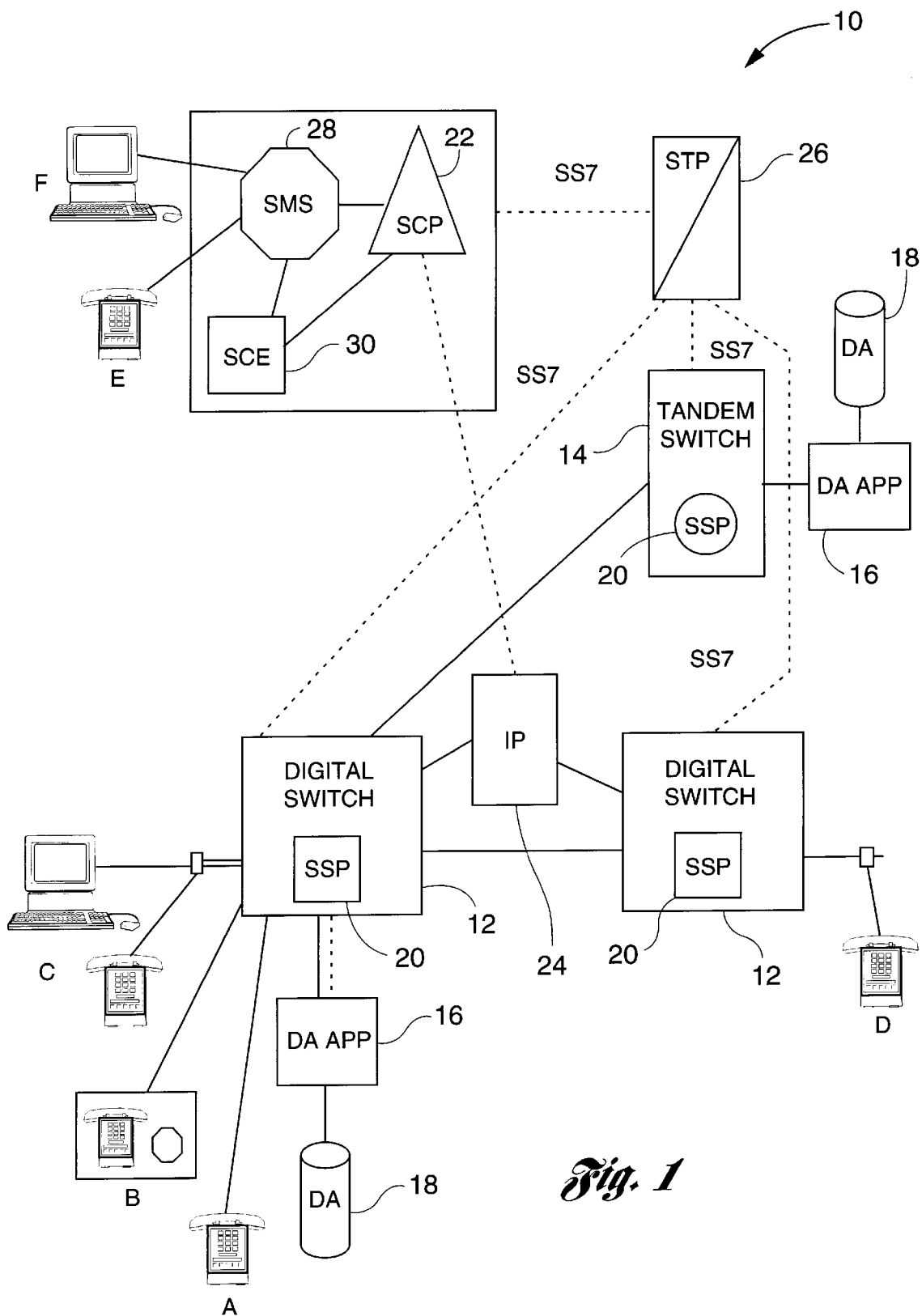
FIG. 1 is a schematic diagram illustrating the system of the present invention.

Turning now to FIG. 1, there is shown a schematic diagram of the system of the present invention, denoted generally by reference numeral 10. The present invention may be implemented utilizing an intelligent network (IN) or an Advanced Intelligent Network (AIN). Alternatively, the present invention may be implemented on or adjunct to a communication station such as, for example, a public switched network end office switch, or a Customer Premise Equipment (CPE).

For example, in a switch-based system, telephony devices A,B,C, and D are each coupled to one of the digital switches 12 servicing the particular telephony device. The digital switches 12 are coupled to each other and terminate at a tandem switch 14. Tandem switch 14 is in turn coupled to a server application 16 having a directory assistance (DA) database 18. Database 18 includes a variety of information, such as, for example, telephone numbers, names, addresses, fax numbers, pager numbers, electronic mail (i.e., e-mail) addresses, etc, for each person listed in the database.

In this embodiment, a caller at telephony device A dials a code or phone number to access the service. The caller is then connected to the server application 16, which prompts the caller for a telephone number or a name. If prompted for a name, the caller may enter the name using a touch-tone keypad of a telephone in which the letters are mapped to numbers via an algorithm. The server application 16 searches the database 18 to find the most likely match, and may prompt the caller if there are ambiguities.

Based on the touch-tone digits entered, the caller might be presented with an audio menu of the information available or the system might simply speak the information using recorded, digitized, or synthesized speech. The information may include items such as fax numbers, additional telephone lines, pager numbers, cellular numbers, e-mail addresses, and Uniform Resource Locators (URLs) (i.e., an electronic address as opposed to a physical address).

If the caller is presented with an audio menu, selecting an item on the menu causes just the information associated with the item to be spoken. Upon hearing a number spoken, the caller has the option of entering a code or digit to initiate an application that attempts to connect the caller to the owner of the number. For example, if the caller had just been given a paging number, the caller may enter a single digit to initiate a page. If there is no answer, the caller has the option of leaving a voice message. The voice message may be spoken by the caller or converted into synthesized speech from a text message, described in greater detail below.

If, on the other hand, the caller had been given an e-mail address, fax number, or pager number supporting text messaging, the caller may then send an e-mail message, fax, or page text message to the person. The text message, such as, for example, "Call Home", "Give me a Call", etc. may be entered completely utilizing a touch-tone keypad or some other input device, such as a computer keyboard. The message may alternatively be selected from a plurality of pre-stored text messages utilizing a menu. Still further, the message might be selected utilizing "intelligent selection" in which some text is entered using touch tones which is then used to infer candidate text messages. That is, in "intelligent selection", there may be a large database or a database of elaborate messages. Rather than listening to a long menu of each item, a short phrase may be entered. A message closest in meaning to the phrase would then be inferred and played to the caller for confirmation. For example, if the phrase "meal" was entered, the system might play the phrase "How about dinner tonight?" and/or related phrases for confirmation by the caller.

In an alternative embodiment, an audio message may be recorded in addition to the text message so that different messages can be sent to different addresses. For example, a text message "Pick up your voice mail" could be sent to a text pager while an audio message of any nature is recorded for receipt in a voice mailbox.

In an alternative embodiment, an AIN is superimposed on an existing telecommunications system to provide the enhanced telecommunications services. Switching functions are performed by the base network in a conventional manner. The AIN includes a plurality of service switching points (SSPs) 20, and an adjunct processor such as, for example, a service control point (SCP) 22. The AIN may also include an intelligent processor (IP) 24 which provides specialized functionality, such as speech recognition, voice announcements, and speech synthesis capability. The functionality of the IP 24 may be implemented in a separate network element, or may be implemented through a multimedia SCP 22.

The SSP 20 is a switch that operates to recognize service requests, process telephone calls, and request/receive call handling instructions to complete a telephone call. The SSP 20 provides intelligent network "triggering"—detecting a condition which requires the SSP 20 to initiate the AIN service by sending a query to the SCP 22—used by the network to recognize requests. The SSP 20 also formulates and transmits requests to the SCP 22 and processes replies and requests from the SCP 22. The SSP 20 creates and plays intelligent network announcements formulated by the service provider (e.g., the local exchange or interexchange carrier), and transmits event messages (such as busy or no reply signals) to the SCP 22.

The SCP 22 is an AIN element which stores call control and call routing instructions executed by an SSP 20. The SCP 22 receives requests from the SSP 20 and determines the destination telephone number. The SCP 22 receives and processes event messages from the SSP 20, and formulates and sends responses to the SSP 20. The SCP 22 processes accounting and statistical information, such as the number of the calling party, the dialed intelligent network number, duration or type of ringing tone or call waiting signal, and other such call parameters.

The AIN includes a Service Transfer Point (STP) 26, coupled to each of the switches 12,14, a Service Management System (SMS) 28 coupled to telephony devices E and F, and a Service Creation Environment (SCE) 30 coupled to the SMS 28 and SCP 22. The SSPs 20, SCP 22, IP 24 and STP 26 are all provided in communication with each other via Signaling System No. 7 (SS7) protocol or a similar messaging protocol and system. The STP 26 is a switch that relays messages between network switches and databases.

The SMS 28 is used to define the call routing logic on the AIN network. Commands are entered and translated into If-then logic, which is then stored in the SCP 22. The SMS 28 is also used to enter parameter settings and other information in a database associated with the SCP 22 that a program would access to make call routing or other call processing decisions, and/or to provide information to a caller based on commands (e.g. touch-tone) entered by the caller. The SCP 30 is a program or tool that provides an interface, such as, for example, a graphical interface, for entering information.

In this embodiment, when the caller enters a service code or phone number, a signal is sent to the SCP 22 which determines that the call is an information indexing call, i.e., a call seeking information from the database 18. The SCP 22 then sends a signal to one of the server applications 16 to prompt the caller for a touch tone number or name. The server application 16 then sends a query to the database 18, which could either be local to the server application 16 or stored remotely in the SCP 22.

In response to the query, an identifier associated with the number or name is returned, which could be returned as either a digital recording or synthesized speech. The features associated with the present invention are the same as with the switch-based network, i.e, the caller has the option of selecting a digit in order to be automatically connected to the person, leaving an e-mail message for the person, or sending a text message to the person.

In either of two embodiments discussed above, the caller may use a telephony device B, such as a screen-phone. The screen-phone B typically runs an application that converts a data signal into a local display format. In this case, the information coming from server application 16 is sent as data over voice (DOV) or data under voice (DUV) to the screen phone B. The application in the screen-phone B could potentially convert it into speech locally, and/or display it on the local display as text.

The screen-phone B may have a keyboard associated with it so that the caller can enter a text message to be sent for e-mails, faxes, etc. Instead of a keyboard, the screen-phone B may have function keys associated with the display which could be used for acting on the address information returned to the caller.

Alternatively, the caller may interface with the server applications 16 with a telephone/Personal Computer (PC), as indicated at C. The caller is connected to the network 10 using two actual or virtual lines. The virtual lines could be implemented using ADSL or a cable modem, for example. In this case, the database 18 associates the data address of the PC with the telephone number associated with the analog line.

When the caller places a call over the analog line to obtain the addressing information associated with a name or number, the server application 16 sets up a virtual or actual data connection with the PC. The PC is assumed to be running an application that is equivalent to the application running in the screen-phone B. This alternative is similar to that of the screen-phone B except that separate voice and data channels are utilized, rather than a data over voice (DOV) or data under voice (DUV) protocol on an analog line.

If the screen-phone B or telephone/computer C implementation is utilized, additional information may be presented to the caller. This additional information may be an electronic address, such as a Uniform Resource Locator (URL). If a URL is associated with the phone number or name entered, and the application running in either B or C recognizes a URL, the application could then retrieve the page associated with the URL off the Internet or from a network server storing a corresponding page and display it on the screen of either B or C. Thus, when a caller enters a phone number or name using their touch-tone interface, they could get back a graphical page listing all the information associated with the person identified, or a graphical page that the person identified has chosen to be returned when callers try to track down information about them. The former implementation is useful for residential customers who might not have their own URL, while the latter is useful businesses who most often doe have their own URL.

Figure 2A:
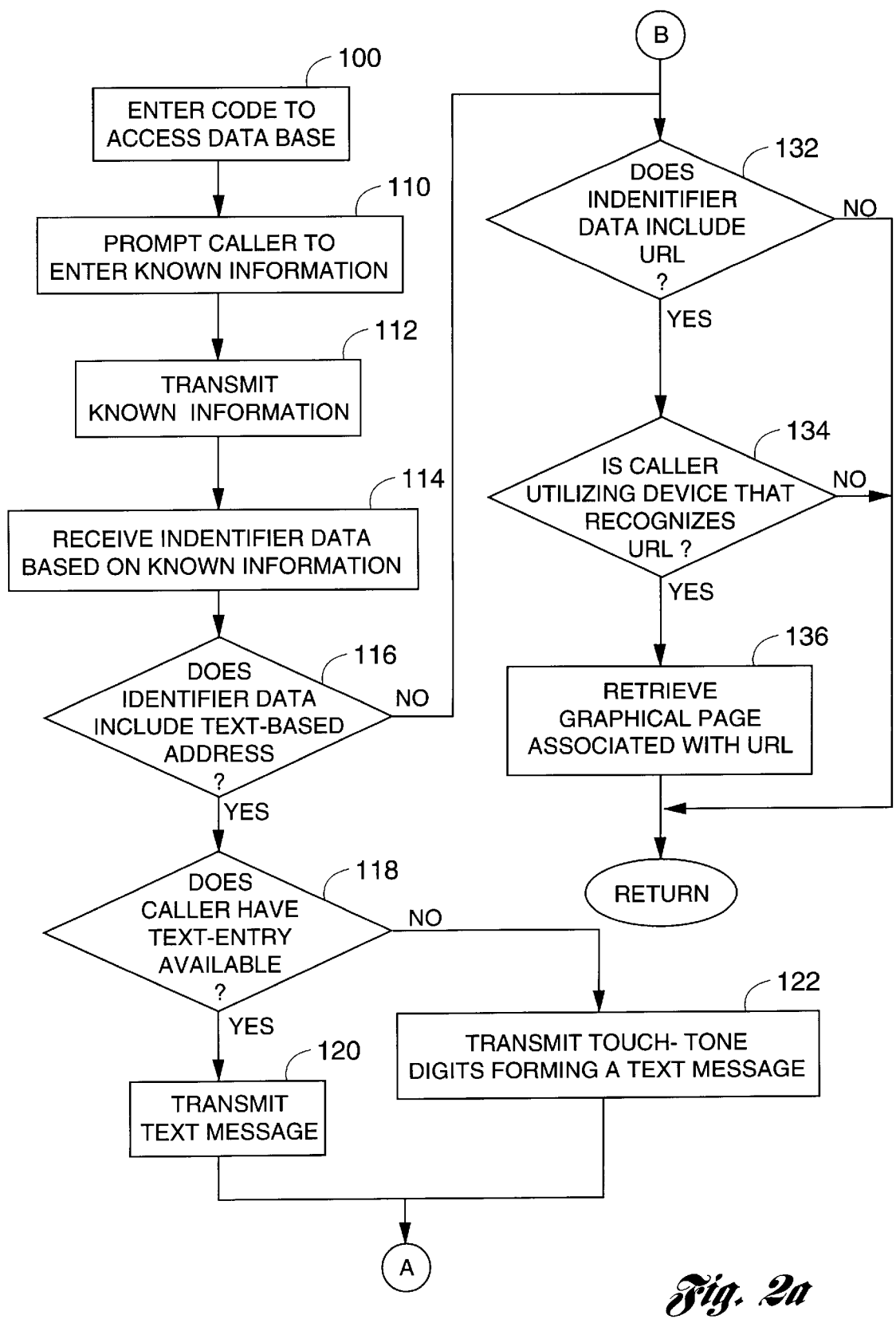
FIGS. 2a–2b are flow diagrams illustrating the general sequence of steps associated with the present invention.
Figure 2B:
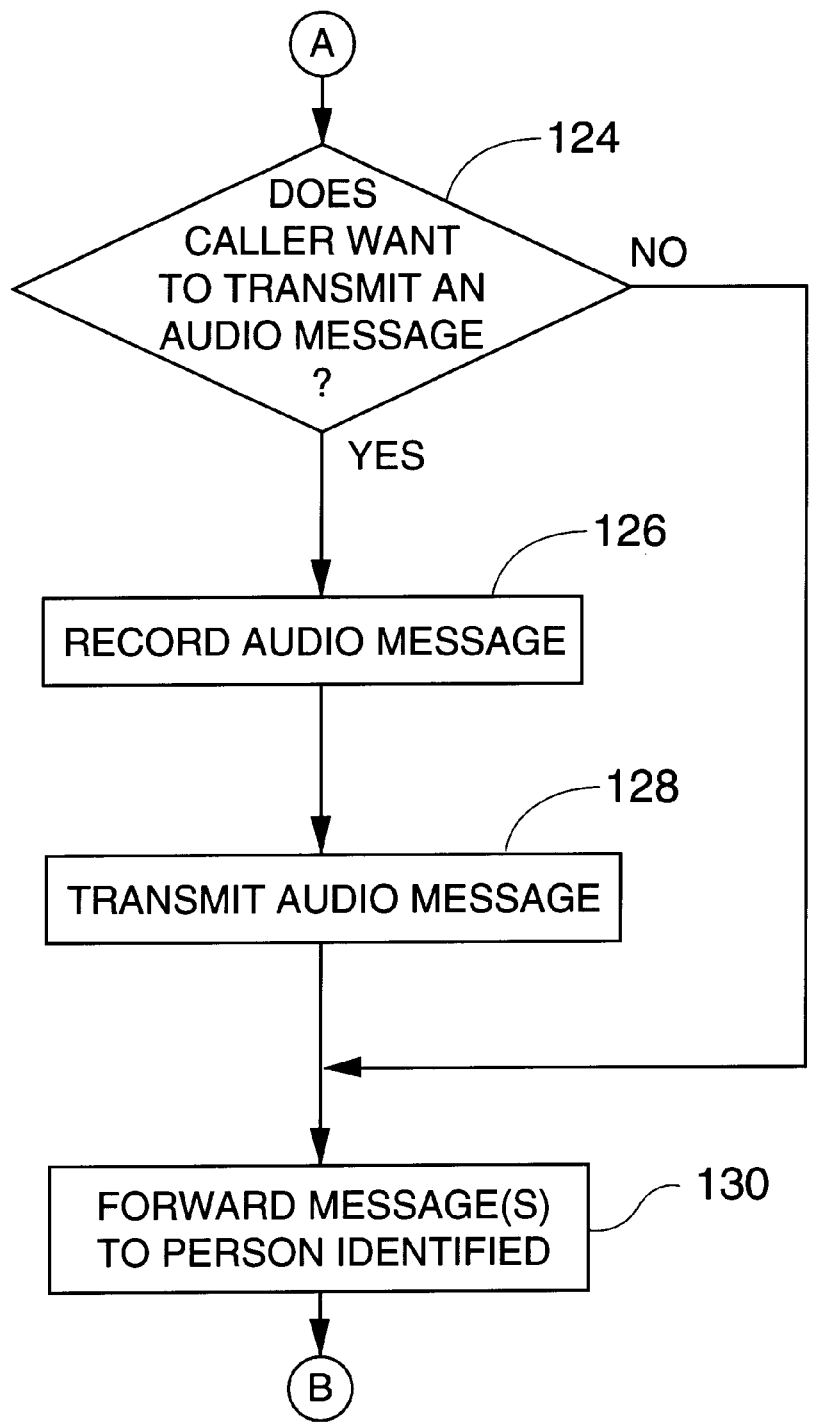

Turning now to FIGS. 2a–2b, there are shown flow diagrams illustrating the general sequence of steps associated with the present invention. First, the caller enters an access code or phone number to access the server application 16, as shown at block 100. The caller is then prompted to enter the known information, i.e., number, name, or address, as shown at block 110.

The caller enters the known information, which is then transmitted to the server application 16, as shown at block 112. As discussed above, the information may be entered utilizing touch-tone keypad associated with a telephone, or a keyboard associated with a telephone or PC. The server application 16 receives this information, searches the database 18, and retrieves identifier data associated with the known information. The identifier data is then transmitted for receipt by the caller, as shown at block 114.

A determination is made as to whether the identifier data includes a text-based address, as shown at conditional block 116. A text-based address includes an address in which text messages may be received, such as, for example, an e-mail address, a fax number, or a pager number. If so, the caller has the ability to send a text message depending on the type of data entry device he/she has, as shown at conditional block 118.

If the caller has text-entry available, such as a keyboard or function keys, the caller can then transmit a text message, as shown at block 120. If the caller does not have text-entry available, the caller can transmit touch-tone digits forming a text message in any manner described above, as shown at block 122.

The caller may have the option of transmitting an audio message along with the text message, as shown at conditional block 124. If so, the caller records his/her message, block 126, and transmits the audio message, block 128. At this time, the server application 16 receives the text and possibly audio message and forwards them to the person identified by the known information, as shown at block 130.

The method proceeds to determine whether the identifier data includes a URL, as shown at conditional block 132. If there is a URL associated with the person identified and if the caller is utilizing a telephony device that recognizes a URL, conditional block 134, the caller's telephony device automatically retrieves the graphical page associated with the URL, as shown at block 136.

Thus, the present invention allows for any of the known addresses (e.g., e-mail or residential) or phone numbers (e.g., telephone number or fax number) to retrieve any of the other addresses or numbers. Text messages can then be transmitted to the person identified, and if applicable, graphical pages associated with the person identified can be downloaded and retrieved by the caller.

While the best modes for carrying out the invention have been described in detail, those familiar with the art to which this invention relates will recognize various alternative designs and embodiments for practicing the invention as defined by the following claims.

What is claimed is:

1. For use with a server application in a circuit switched telephone network having a database containing addresses and phone numbers associated with a subscriber, a method for transmitting a text message from a caller to the subscriber at an unknown address based on a known address or number associated with the subscriber, the method comprising:

initiating a voice telephone call from the caller to the server application over the circuit switched telephone network by transmitting a first signal over the circuit switched telephone network to obtain access to the database;

transmitting a second signal from the caller to the server application representative of one of the known address and number upon accessing the database;

receiving one of a text-based address and number associated with the subscriber from the server application in response to the second signal, both the text-based address and number being capable of receiving text messages;

receiving an originate text message prompt from the server application that allows the caller to opt to originate a text message for transmission to the subscriber; and originating and transmitting the text message at least partially over the circuit switched telephone network to one of the text-based address and number for receipt by the subscriber.

2. The method as recited in claim 1 wherein transmitting the text message includes transmitting at least one touch-tone digit.

3. The method as recited in claim 1 wherein receiving one of the text-based address and number includes receiving a third signal indicating a plurality of predefined text messages available to be transmitted to the subscriber and wherein transmitting a text message includes transmitting a fourth signal selecting one of the plurality of predefined text messages.

4. The method as recited in claim 3 wherein the third signal is an audio signal.

5. The method as recited in claim 3 wherein the third signal is a visual signal.

6. The method as recited in claim 1 wherein transmitting the text message includes transmitting at least a portion of the text message.

7. The method as recited in claim 1 wherein receiving one of the text-based address and number further includes receiving an electronic address containing graphical information associated with the subscriber in response to the second signal.

8. The method as recited in claim 7 further comprising automatically retrieving and displaying the graphical information.

9. A system for transmitting a text message from a caller to the subscriber at an unknown address based on a known address or number associated with the subscriber, the system comprising:

a server application on a circuit switched telephone network having a database containing addresses and phone numbers associated with the subscriber;

an input device for initiating a voice telephone call from the caller to the server application over the circuit switched telephone network by transmitting a first signal over the circuit telephone switched network to obtain access to the database and transmitting a second signal from the caller to the server application representative of one of the known address and number upon accessing the database;

means for receiving one of a text-based address and number associated with the subscriber from the server application in response to the second signal, both the text-based address and number capable of receiving text messages; and the server being configured to send an originate text message prompt that allows the caller to opt to originate a text message for transmission to the subscriber; and the input device being configured to originate and transmit the text message at least partially over the circuit switched telephone network to one of the text-based address and number for receipt by the subscriber.

10. The system as recited in claim 9 wherein the input device includes a touch-tone keypad for transmitting at least one touch-tone digit.

11. The system as recited in claim 9 wherein the input device includes a keyboard for transmitting text.

12. The system as recited in claim 9 wherein the means for receiving is further operative to receive a third signal indicating a plurality of predefined text messages available to be transmitted to the subscriber and wherein the input device is further operative to transmit a fourth signal selecting one of the plurality of predefined text messages.

13. The system as recited in claim 12 wherein the third signal is an audio signal.

14. The system as recited in claim 12 wherein the third signal is a visual signal.

15. The system as recited in claim 9 wherein the input device is operative to transmit at least a portion of the text message.

16. The system as recited in claim 9 wherein the means for receiving is further operative to receive an electronic address containing graphical information associated with the subscriber in response to the second signal.

17. The system as recited in claim 16 further comprising:

an application coupled to the means for receiving for automatically retrieving the graphical information; and a display for displaying the graphical information.

* * * * *